(12) United States Patent
Ngo et al.

(10) Patent No.: US 8,959,299 B2
(45) Date of Patent: Feb. 17, 2015

(54) USING A SNAPSHOT AS A DATA SOURCE

(75) Inventors: David Ngo, Shrewsbury, NJ (US);
Anand Prahlad, East Brunswick, NJ (US); Parag Gokhale, Ocean, NJ (US); Rahul S. Pawar, Marlboro, NJ (US)

(73) Assignee: CommVault Systems, Inc., Tinton Falls, NJ (US)

( * ) Notice: Subject to any disclaimer, the term of this patent is extended or adjusted under 35 U.S.C. 154(b) by 949 days.

(21) Appl. No.: 12/558,947

(22) Filed: Sep. 14, 2009

(65) Prior Publication Data

US 2010/0070726 A1     Mar. 18, 2010

Related U.S. Application Data

(60) Provisional application No. 61/097,407, filed on Sep. 16, 2008.

(51) Int. Cl.
*G06F 12/00* (2006.01)
*G06F 11/14* (2006.01)

(52) U.S. Cl.
CPC ........ *G06F 11/1469* (2013.01); *G06F 11/1464* (2013.01); *G06F 11/1466* (2013.01); *G06F 2201/84* (2013.01)
USPC .................................. 711/162; 711/E12.103

(58) Field of Classification Search
USPC ......................................................... 711/162
See application file for complete search history.

(56) References Cited

U.S. PATENT DOCUMENTS

| 4,686,620 | A | 8/1987 | Ng |
| 4,995,035 | A | 2/1991 | Cole et al. |
| 5,005,122 | A | 4/1991 | Griffin et al. |
| 5,093,912 | A | 3/1992 | Dong et al. |
| 5,133,065 | A | 7/1992 | Cheffetz et al. |
| 5,193,154 | A | 3/1993 | Kitajima et al. |
| 5,212,772 | A | 5/1993 | Masters |
| 5,226,157 | A | 7/1993 | Nakano et al. |
| 5,239,647 | A | 8/1993 | Anglin et al. |
| 5,241,668 | A | 8/1993 | Eastridge et al. |
| 5,241,670 | A | 8/1993 | Eastridge et al. |
| 5,263,154 | A | 11/1993 | Eastridge et al. |
| 5,276,860 | A | 1/1994 | Fortier et al. |
| 5,276,867 | A | 1/1994 | Kenley et al. |
| 5,287,500 | A | 2/1994 | Stoppani, Jr. |

(Continued)

FOREIGN PATENT DOCUMENTS

| EP | 0259912 A1 | 3/1988 |
| EP | 0405926 A2 | 1/1991 |

(Continued)

OTHER PUBLICATIONS

U.S. Appl. No. 13/076,765, filed Mar. 31, 2011, Bansod.

(Continued)

*Primary Examiner* — Larry Mackall
(74) *Attorney, Agent, or Firm* — Perkins Coie LLP

(57) ABSTRACT

A system and method for using a snapshot as a data source is described. In some cases, the system stores a snapshot and an associated data structure or index to storage media to create a secondary copy of a volume of data. In some cases, the associated index includes application specific data about a file system or other application that created the data to identify the location of the data. The associated index may include three entries, and may be used to facilitate the recovery of data via the snapshot.

17 Claims, 8 Drawing Sheets

(56) References Cited

U.S. PATENT DOCUMENTS

| | | | |
|---|---|---|---|
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,604,862 A | 2/1997 | Midgely et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,699,361 A | 12/1997 | Ding et al. |
| 5,720,026 A | 2/1998 | Uemura et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,812,398 A | 9/1998 | Nielsen |
| 5,813,009 A | 9/1998 | Johnson et al. |
| 5,813,017 A | 9/1998 | Morris |
| 5,819,292 A * | 10/1998 | Hitz et al. ............................. 1/1 |
| 5,875,478 A | 2/1999 | Blumenau |
| 5,878,408 A | 3/1999 | Van Huben et al. |
| 5,887,134 A | 3/1999 | Ebrahim |
| 5,901,327 A | 5/1999 | Ofek |
| 5,907,672 A * | 5/1999 | Matze et al. ................ 714/6.13 |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,021,475 A | 2/2000 | Nguyen et al. |
| 6,026,414 A | 2/2000 | Anglin |
| 6,052,735 A | 4/2000 | Ulrich et al. |
| 6,072,490 A | 6/2000 | Bates et al. |
| 6,076,148 A | 6/2000 | Kedem |
| 6,094,416 A | 7/2000 | Ying |
| 6,131,095 A | 10/2000 | Low et al. |
| 6,131,148 A | 10/2000 | West et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,195,695 B1 | 2/2001 | Cheston et al. |
| 6,205,450 B1 | 3/2001 | Kanome |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,311,193 B1 | 10/2001 | Sekido |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,904 B1 | 2/2002 | Bartmann et al. |
| RE37,601 E | 3/2002 | Eastridge et al. |
| 6,356,801 B1 | 3/2002 | Goodman et al. |
| 6,366,986 B1 | 4/2002 | St. Pierre et al. |
| 6,366,988 B1 | 4/2002 | Skiba et al. |
| 6,374,363 B1 | 4/2002 | Wu et al. |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,434,681 B1 | 8/2002 | Armangau |
| 6,473,775 B1 | 10/2002 | Kusters et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,564,228 B1 | 5/2003 | O'Connor |
| 6,604,118 B2 | 8/2003 | Kleiman et al. |
| 6,631,477 B1 | 10/2003 | LeCrone et al. |
| 6,643,671 B2 | 11/2003 | Milillo et al. |
| 6,647,473 B1 | 11/2003 | Golds et al. |
| 6,651,075 B1 | 11/2003 | Kusters et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,721,767 B2 | 4/2004 | De Meno et al. |
| 6,728,736 B2 | 4/2004 | Hostetter et al. |
| 6,732,125 B1 | 5/2004 | Autrey et al. |
| 6,760,723 B2 | 7/2004 | Oshinsky et al. |
| 6,792,518 B2 | 9/2004 | Armangau et al. |
| 6,799,258 B1 | 9/2004 | Linde |
| 6,826,661 B2 | 11/2004 | Umbehocker et al. |
| 6,832,299 B2 | 12/2004 | Shimada et al. |
| 6,871,271 B2 | 3/2005 | Ohran et al. |
| 6,880,051 B2 | 4/2005 | Timpanaro-Perrotta |
| 6,898,688 B2 | 5/2005 | Martin et al. |
| 6,912,627 B2 | 6/2005 | Matsunami et al. |
| 6,915,313 B2 | 7/2005 | Yao |
| 6,938,135 B1 | 8/2005 | Kekre et al. |
| 6,948,038 B2 | 9/2005 | Berkowitz et al. |
| 6,948,089 B2 | 9/2005 | Fujibayashi |
| 6,954,834 B2 | 10/2005 | Slater et al. |
| 6,959,310 B2 | 10/2005 | Eshel et al. |
| 6,981,114 B1 | 12/2005 | Wu et al. |
| 6,981,177 B2 | 12/2005 | Beattie |
| 6,993,539 B2 | 1/2006 | Federwisch et al. |
| 7,003,641 B2 | 2/2006 | Prahlad et al. |
| 7,035,880 B1 | 4/2006 | Crescenti et al. |
| 7,080,088 B1 | 7/2006 | Lau |
| 7,165,079 B1 | 1/2007 | Chen et al. |
| 7,174,352 B2 | 2/2007 | Kleiman et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,231,544 B2 | 6/2007 | Tan et al. |
| 7,234,115 B1 | 6/2007 | Sprauve et al. |
| 7,237,075 B2 | 6/2007 | Welsh et al. |
| 7,240,219 B2 | 7/2007 | Teicher et al. |
| 7,275,177 B2 | 9/2007 | Armangau et al. |
| 7,296,125 B2 | 11/2007 | Ohran |
| 7,346,623 B2 | 3/2008 | Prahlad et al. |
| 7,383,538 B2 | 6/2008 | Bates et al. |
| 7,386,532 B2 | 6/2008 | Kiessig et al. |
| 7,395,282 B1 | 7/2008 | Crescenti et al. |
| 7,406,048 B2 | 7/2008 | Datta et al. |
| 7,412,583 B2 | 8/2008 | Burton et al. |
| 7,426,052 B2 | 9/2008 | Cox et al. |
| 7,480,779 B2 | 1/2009 | Tsuji |
| 7,509,316 B2 | 3/2009 | Greenblatt et al. |
| 7,529,782 B2 | 5/2009 | Prahlad et al. |
| 7,539,707 B2 | 5/2009 | Prahlad et al. |
| 7,539,735 B2 | 5/2009 | Fruchtman et al. |
| 7,549,028 B2 | 6/2009 | Thompson et al. |
| 7,567,991 B2 | 7/2009 | Armangau et al. |
| 7,568,080 B2 | 7/2009 | Prahlad et al. |
| 7,580,950 B2 | 8/2009 | Kavuri et al. |
| 7,587,563 B1 * | 9/2009 | Teterin et al. ................ 711/162 |
| 7,596,611 B2 | 9/2009 | Satish et al. |
| 7,600,219 B2 | 10/2009 | Tsantilis |
| 7,620,666 B1 | 11/2009 | Root et al. |
| 7,651,593 B2 | 1/2010 | Prahlad et al. |
| 7,707,184 B1 | 4/2010 | Zhang et al. |
| 7,716,171 B2 | 5/2010 | Kryger |
| 7,716,183 B2 | 5/2010 | Lee |
| 7,725,440 B2 | 5/2010 | Reed et al. |

(56) References Cited

U.S. PATENT DOCUMENTS

| | | | |
|---|---|---|---|
| 7,734,578 B2 | 6/2010 | Prahlad et al. | |
| 7,761,456 B1 | 7/2010 | Cram et al. | |
| 7,840,533 B2 | 11/2010 | Prahlad et al. | |
| 7,844,577 B2 | 11/2010 | Becker et al. | |
| 7,873,806 B2 | 1/2011 | Prahlad et al. | |
| 7,933,927 B2 | 4/2011 | Dee et al. | |
| 7,979,389 B2 | 7/2011 | Prahlad et al. | |
| 8,055,625 B2 | 11/2011 | Prahlad et al. | |
| 8,433,872 B2 | 4/2013 | Prahlad et al. | |
| 8,468,518 B2 | 6/2013 | Wipfel | |
| 8,543,998 B2 | 9/2013 | Barringer | |
| 2002/0107877 A1 | 8/2002 | Whiting et al. | |
| 2003/0028514 A1 | 2/2003 | Lord et al. | |
| 2003/0028736 A1* | 2/2003 | Berkowitz et al. | 711/162 |
| 2003/0033346 A1 | 2/2003 | Carlson et al. | |
| 2003/0167380 A1 | 9/2003 | Green et al. | |
| 2003/0177149 A1 | 9/2003 | Coombs | |
| 2004/0139125 A1 | 7/2004 | Strassburg et al. | |
| 2004/0170374 A1 | 9/2004 | Bender et al. | |
| 2004/0230566 A1 | 11/2004 | Balijepalli et al. | |
| 2004/0260678 A1 | 12/2004 | Verbowski et al. | |
| 2005/0086241 A1* | 4/2005 | Ram et al. | 707/100 |
| 2005/0203864 A1 | 9/2005 | Schmidt et al. | |
| 2006/0224846 A1 | 10/2006 | Amarendran et al. | |
| 2007/0185925 A1 | 8/2007 | Prahlad et al. | |
| 2007/0185940 A1 | 8/2007 | Prahlad et al. | |
| 2008/0028009 A1 | 1/2008 | Ngo | |
| 2008/0091655 A1 | 4/2008 | Gokhale et al. | |
| 2008/0183775 A1 | 7/2008 | Prahlad et al. | |
| 2008/0228771 A1 | 9/2008 | Prahlad et al. | |
| 2008/0229037 A1 | 9/2008 | Bunte et al. | |
| 2008/0243879 A1 | 10/2008 | Gokhale et al. | |
| 2008/0243953 A1* | 10/2008 | Wu et al. | 707/204 |
| 2008/0294605 A1 | 11/2008 | Prahlad et al. | |
| 2009/0182963 A1 | 7/2009 | Prahlad et al. | |
| 2009/0300641 A1 | 12/2009 | Friedman et al. | |
| 2009/0319534 A1 | 12/2009 | Gokhale | |
| 2009/0319585 A1 | 12/2009 | Gokhale | |
| 2010/0070725 A1 | 3/2010 | Prahlad et al. | |
| 2010/0257142 A1* | 10/2010 | Murphy et al. | 707/681 |
| 2010/0293144 A1 | 11/2010 | Bonnet | |
| 2010/0312754 A1 | 12/2010 | Bear et al. | |
| 2010/0313185 A1 | 12/2010 | Gupta et al. | |
| 2011/0131187 A1 | 6/2011 | Prahlad et al. | |
| 2011/0264620 A1 | 10/2011 | Prahlad et al. | |
| 2013/0013563 A1 | 1/2013 | Prahlad et al. | |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0838758 | 4/1998 |
| EP | 0899662 A1 | 3/1999 |
| EP | 0981090 A1 | 2/2000 |
| EP | 1349088 | 10/2003 |
| EP | 1579331 | 9/2005 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 2000347811 | 12/2000 |
| WO | WO-9303549 | 2/1993 |
| WO | WO-9513580 A1 | 5/1995 |
| WO | WO-9912098 A1 | 3/1999 |
| WO | WO-0104755 A1 | 1/2001 |
| WO | WO-02-088943 | 11/2002 |
| WO | WO-03028183 | 4/2003 |
| WO | WO-03046768 A1 | 6/2003 |
| WO | WO-2004034197 | 4/2004 |

OTHER PUBLICATIONS

U.S. Appl. No. 13/250,763, filed Sep. 20, 2011, Prahlad.
OpenAir.com, Product Update—Jun. 21, 2001, http://web.archive.org/web/20011007153900 1http:llwww.openair.comlhomeln.s-ub.--p.sub.--update062101 .html, Oct. 2001, 3 pages.
Veritas Software Corporation, "Veritas Volume Manager 3.2, Administrator's Guide," Aug. 2001, 360 pages.
Armstead et al., "Implementation of a Campus-wide Distributed Mass Storage Service: The Dream vs. Reality," IEEE, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
Jander, M., "Launching Storage-Area Net," Data Communications, US, McGraw Hill, NY, vol. 27, No. 4 (Mar. 21, 1998), pp. 64-72.
Jason Gait, "The Optical File Cabinet: A Random-Access File System for Write-Once Optical Disks," IEEE Computer, vol. 21, No. 6, pp. 11-22 (1988) (see in particular figure 5 in p. 15 and recitation in claim 5).
Rosenblum et al., "The Design and Implementation of a Log-Structured File System," Operating Systems Review SIGOPS, vol. 25, No. 5, New York, US, pp. 1-15 (May 1991).
International Search Report and Written Opinion for International Application No. PCT/US09/57102, Mail Date Nov. 6, 2009, 14 pages.
Network Appliance, Inc., "Network Appliance Snapshot Technology," copyright 2004, 1 page.
Hitachi Data Systems, "Hitachi HiCommand Protection Manager Software," Feb. 2007, 2 pages.
Microsoft TechNet, "What is Volume Shadow Copy Service?" Mar. 28, 2003, 5 pages.
EMC Corporation, "EMC CLARiiON CX Series," May 2006, 7 pages.
EMC Corporation, "EMC CLARiiON CX3 UltraScale Series," Feb. 2008, 6 pages.
EMC Corporation, "EMC Symmetrix DMX Series," Jan. 2008, 8 pages.
U.S. Appl. No. 12/978,984, filed Dec. 27, 2010, Ngo.
U.S. Appl. No. 12/979,101, filed Dec. 27, 2010, Prahlad.
Marshall, David, "Veeam's SureBackup transforms VMware image backups," <http://www.infoworld.com/print/117315>, internet accessed on Mar. 23, 2010, 4 pages.
Veeam Software, "The New Standard for Data Protection," internet accessed on Mar. 23, 2010, 2 pages, Mar. 22, 2010.
U.S. Appl. No. 12/553,199, filed Sep. 3, 2009, Lad.
U.S. Appl. No. 12/565,576, filed Sep. 23, 2009, Kottomtharayil et al.
U.S. Appl. No. 12/647,906, filed Dec. 28, 2009, Attarde.
U.S. Appl. No. 12/649,454, filed Dec. 30, 2009, Muller.
CommVault Systems, Inc., "CommVault Galaxy Express 7.0 Backup & Recovery," copyright date 1999-2007, 4 pages.
CommVault Systems, Inc., "CommVault QiNetix: Architecture Overview," CommVault Systems White Paper, 2005, 35 pages.
CommVault Systems, Inc., "CommVault Simpana Software with SnapBackup," copyright date 1999-2009, 6 pages.
Commvault, "Remote Backup," <http://documentation.commvault.com/commvault/release_8_0_0/books_online_1/english_us/features/ddr/ddr.htm>, internet accessed on Dec. 17, 2009, 8 pages.
CommVault, "Snap Backup," <http://documentation.commvault.com/commvault/release_8_0_0/books_online_1/english_us/features/snap_backup/snap_backup.htm>, internet accessed on Dec. 17, 2009, 7 pages.

(56) References Cited

OTHER PUBLICATIONS

CommVault, "Snapshots," <http://documentation.commvault.com/commvault/release_8_0_0/books_online_1/english_us/features/snapshots/snapshots.htm>, internet accessed on Dec. 15, 2009, 2 pages.
CommVault, "Volume Shadow Services (VSS)," <http://documentation.commvault.com/commvault/release_8_0_0/books_online_1/english_us//features/snapshots/vss/vss.htm>, internet accessed on Dec. 23, 2009, 1 page.
Garimella, N., "Understanding and Exploiting Snapshot Technology for Data Protection, Part 1: Snapshot Technology Overview," <http://www.ibm.com/developerworks/tivoli/library/t-snaptsm1/index.html>internet accessed on Dec. 22, 2009, 8 pages, 4 pages.
Microsoft TechNet, "How Volume Shadow Copy Service Works," <http://technet.microsoft.com/en-us/library/cc785914(WS.10,printer).aspx>, internet accessed on Dec. 17, 2009, 6 pages, Mar. 28, 2003.
Microsoft TechNet, "Overview of Exchange Server Backup Methods," <http://technet.microsoft.com/en-us/library/aa996125(EXCHG.65,printer).aspx>, internet accessed on Dec. 29, 2009, 3 pages.
Microsoft, "Microsoft System Center Data Protection Manager 2007: Product Overview," undated, 2 pages.
Microsoft.com, "XADM: Hot Split Snapshot Backups of Exchange," <http://support.microsoft.com/kb/311898/>, internet accessed on Dec. 29, 2009, 5 pages.
MSDN, "Backup Sequence Diagram," <http://msdn.microsoft.com/en-us/library/ms986539(EXCHG.65,printer).aspx>, internet accessed on Dec. 30, 2009, 1 page.
MSDN, "Exchange Transaction Logs and Checkpoint Files," <http://msdn.microsoft.com/en-us/library/ms986143(EXCHG.65,printer).aspx>, internet accessed on Dec. 30, 2009, 1 page.
MSDN, "Identifying Required Transaction Logs," <http://msdn.microsoft.com/en-us/library/ms986606(EXCHG.65,printer).aspx>, internet accessed on Dec. 30, 2009, 1 page.
MSDN, "Overview of Processing a Backup Under VSS," <http://msdn.microsoft.com/en-us/library/aa384589(VS.85,printer).aspx>, internet accessed on Dec. 18, 2009, 3 pages.
MSExchange.org, "Exchange log disk is full, Prevention and Remedies," <http://www.msexchange.org/articles/exchange-log-disk-full.html?printversion>, internet accessed on Dec. 30, 2009, 7 pages.
NetApp, "NetApp SnapManager for Microsoft Exchange," 2009, 2 pages.
Wikipedia.org, "Snapshot (computer storage)," <http://en.wikipedia.org/w/index.php?title=Snapshot_(computer_storage)>, internet accessed on Dec. 15, 2009, 3 pages.
Microsoft, "Microsoft System Center Data Protection Manager 2007: Microsoft Exchange Server," At Least Published by Sep. 13, 2009, 2 pages.
Microsoft, "Microsoft System Center Data Protection Manager 2007: Microsoft SharePoint Products and Technologies," At Least Published by Sep. 13, 2009, 2 pages.
Australian Examiner's First Report on Patent Application No. 2009293328, Mail Date Dec. 21, 2011, 2 pages.
U.S. Appl. No. 13/792,104, filed Mar. 10, 2013, Varadharajan et al.
U.S. Appl. No. 13/893,967, filed May 14, 2013, Prahlad et al.
U.S. Appl. No. 13/873,085, filed Apr. 29, 2013, Prahlad et al.
U.S. Appl. No. 13/874,323, filed Apr. 30, 2013, Prahlad et al.
"Software Builds and the Virtual Machine," Dr. Dobb's, Jan. 23, 2008, 2 pages.
CNET Reviews, "IPStor Enterprise Edition ZeroImpact Backup Enabler Option—(V.4.0) Manufacturer Description", May 8, 2004, 1 page.
CommVault Partner Advantage, "CommVault First to Market with Complete 'Zero Impact' Backup Soltuions for Mixed Windows and UNIX Environments", <http://partners.commvault.com/microsoft/microsoft_news_story.asp?id=164>, Sep. 25, 2002, 2 pages.
FalconStor Software, "Impact-free Backup of Vmware Environments", http://www.falconstor.com/dmdocuments/HyperTrac_for_VMware_SB_HR.pdf>, 2011, 2 pages.
FalconStor Software, "Unified Backup & DR for Vmware Environments", http://www.falconstor.com/dmdocuments/UniBU-DR_CDP_SB_100520.pdf>, 2001, 2 pages.
FalconStor Software, "Zero-impact Unified Backup & DR", <http://www.falconstor.com/solutions/solutions-for-server-virtualization/vmware-solutions/zero-impact-unified-backup-a-dr>, undated, internet accessed May 2, 2012, 1 page.
Robinson, Simon, "CommVault Unveils QiNetix to Unite Data Movement with Storage Management", 451 Research, Oct. 11, 2002, 3 pages.
Tanenbaum, Andrew S. Structured Computer Organization, 1984, Prentice-Hall, Inc. second edition, pp. 10-12.
Fegreus, CommVault Simpana 8.0, Mar. 3, 2010, http://www.virtual-strategy.com/2010/03/03/commvault-simpana.
Harriman-Polanski, CommVault Galaxy Enhances Data Protection, Reprinted from Dell Power Solutions, May 2006.
Managing Data More Effectively in Virtualized Environments with CommVault® Simpana® Universal Virtual Software Agent, © 1999-2009.

* cited by examiner

USING A SNAPSHOT AS A DATA SOURCE

CROSS-REFERENCE TO RELATED APPLICATIONS

This application claims priority to U.S. Patent Application No. 61/097,407, filed on Sep. 16, 2008, entitled USING A SNAPSHOT AS A DATA SOURCE, and is related to U.S. patent application Ser. No. 10/990,353, filed on Nov. 15, 2004, entitled SYSTEM AND METHOD FOR PERFORMING AN IMAGE LEVEL SNAPSHOT AND FOR RESTORING PARTIAL VOLUME DATA, and U.S. patent application Ser. No. 12/058,487, filed on Mar. 28, 2008, entitled METHOD AND SYSTEM FOR OFFLINE INDEXING OF CONTENT AND CLASSIFYING STORED DATA, each of which is incorporated by reference in its entirety.

BACKGROUND

Current storage management systems employ a number of different methods to perform storage operations on electronic data. For example, data can be stored in primary storage as a primary copy or in secondary storage as various types of secondary copies including, as a backup copy, a snapshot copy, a hierarchical storage management copy ("HSM"), as an archive copy, and as other types of copies.

A primary copy of data is generally a production copy or other "live" version of the data which is used by a software application and is generally in the native format of that application. Primary copy data may be maintained in a local memory or other high-speed storage device that allows for relatively fast data access if necessary. Such primary copy data is typically intended for short term retention (e.g., several hours or days) before some or all of the data is stored as one or more secondary copies, for example to prevent loss of data in the event a problem occurred with the data stored in primary storage.

Secondary copies include point-in-time data and are typically for intended for long-term retention (e.g., weeks, months or years depending on retention criteria, for example as specified in a storage policy as further described herein) before some or all of the data is moved to other storage or discarded. Secondary copies may be indexed so users can browse and restore the data at another point in time. After certain primary copy data is backed up, a pointer or other location indicia such as a stub may be placed in the primary copy to indicate the current location of that data.

One form of secondary copy is a snapshot copy. From an end-user viewpoint, a snapshot may be seen as an instant image of the primary copy data at a given point in time. A snapshot generally captures the directory structure of a primary copy volume at a particular moment in time, and also preserves file attributes and contents. In some embodiments, a snapshot may exist as a virtual file system, parallel to the actual file system. Users typically gain a read-only access to the record of files and directories of the snapshot. By electing to restore primary copy data from a snapshot taken at a given point in time, users may also return the current file system to the prior state of the file system that existed when the snapshot was taken.

A snapshot may be created instantly, using a minimum of file space, but may still function as a conventional file system backup when stored at or near the file system. A snapshot may not actually create another physical copy of all the data, but may simply create pointers that are able to map files and directories to specific disk blocks. The snapshot may be a copy of a set of files and/or directories as they were at a particular point in the past. That is, the snapshot is an image, or representation, of a volume of data at a point in time. A snapshot may be as a secondary copy of a primary volume of data, such as data in a file system, an Exchange server, a SQL database, an Oracle database, and so on. The snapshot may be an image of files, folders, directories, and other data objects within a volume, or an image of the blocks of the volume.

Data storage systems utilize snapshots for a variety of reasons. One typical use of snapshots is to copy a volume of data without disabling access to the volume for a long period. After performing the snapshot, the data storage system can then copy the data set by leveraging the snapshot of the data set. Thus, the data storage system performs a full backup of a primary volume when a primary volume is active and generating real-time data. Although performing a snapshot (i.e., taking an image of the data set) is a fast process, the snapshot is typically not an effective or reliable backup copy of a data set, because it does not actually contain the content of the data set. Restoring data from snapshots can be especially cumbersome, because a restoration process cannot restore the data set using snapshots alone. Recovery of individual files or folders can be especially cumbersome, because typical systems often recover an entire snapshot in order to restore an individual file or folder imaged by the snapshot.

However, the speed of performing, or taking, a snapshot can often be a great benefit to data storage systems that are required to store large amounts of data. Thus, utilizing snapshots in ways other than those described above may provide significant utility to data storage systems, because snapshots are fast, are space efficient, and facilitate performing off host data storage operations, among other advantages.

The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Overview

Figure 1:
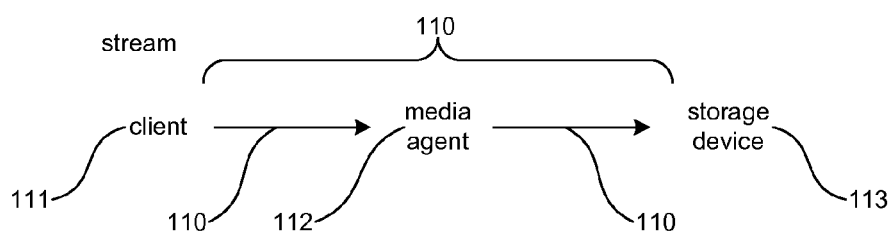
FIG. 1 is a block diagram illustrating components of a data stream utilized by a suitable data storage system.

Described in detail herein is a system and method that employs snapshots as data sources, such as backup copies of data. Instead of treating a snapshot only as a picture of a disk, the system employs snapshots as a data source that can be backed up or otherwise copied to tape or magnetic disk. The system can then seamlessly restore individual files from tape or disk using snapshots. The system creates a data structure, such as an index, that describes what is on a disk (as often defined by a file system for that disk). The index may provide a list of files on the disk, and location information indicating where each file is located, with respect to the snapshot.

In some examples, the system creates a secondary copy of data by storing a snapshot with an index associated with and/or related to the snapshot. The snapshot identifies the data stored in the secondary copy, and the index provides application specific context information that facilitates retrieving data identified by the snapshot. In these examples, the system may store a combination of a snapshot and associated index to storage media, such as to tape or disk, and use the stored combination as a data source, such as a backup copy of a primary volume of data.

The system may create the index in a number of ways, as long as the index can be used in combination with a snapshot to facilitate data storage and/or recovery via the snapshot. For example, an index agent may receive a snapshot of a data set, receive application context information associated with the snapshot, store the snapshot, and store the application context information in an index that identifies individual files from the data set imaged by the snapshot.

In some examples, the system provides for the recovery, or restoration, of data from a snapshot based data source. The recovery may be transparent to a user (that is, the user does not know what mechanism is used during a restore process) and/or seamless with respect to other types of data sources. For example, the system may restore a data set by restoring a full backup of the data set using a snapshot based secondary copy of the data set and incremental backups using other secondary copies.

In some cases, the system restores individual files using snapshots and associated indices. For example, the system may receive a request to restore a specific file or portion of a file, identify a snapshot containing an image of a volume containing the file, look to an index associated with the snapshot to identify the file, and retrieve the file (or a copy of the file) from information in the associated index. Thus, the system facilitates granular recovery of data objects within a data set without requiting a data recovery system to restore entire snapshots or secondary copies.

The system will now be described with respect to various examples. The following description provides specific details for a thorough understanding of, and enabling description for, these examples of the system. However, one skilled in the art will understand that the system may be practiced without these details. In other instances, well-known structures and functions have not been shown or described in detail to avoid unnecessarily obscuring the description of the examples of the system.

The terminology used in the description presented below is intended to be interpreted in its broadest reasonable manner, even though it is being used in conjunction with a detailed description of certain specific examples of the system. Certain terms may even be emphasized below; however, any terminology intended to be interpreted in any restricted manner will be overtly and specifically defined as such in this Detailed Description section.

Suitable System

Referring to FIG. 1, a block diagram illustrating components of a data stream utilized by a suitable data storage system is shown. The stream 110 may include a client 111, a media agent 112, and a secondary storage device 113. For example, in storage operations, the system may store, receive and/or prepare data to be stored, copied or backed up at a server or client 111. The system may then transfer the data to be stored to media agent 112, which may then refer to storage policies, schedule policies, and/retention policies (and other policies) to choose a secondary storage device 113. The media agent 112 may include a snapshot agent and an index agent (although these agents may also be separate components), to be described herein. The secondary storage device 113 receives the data from the media agent 112 and stores the data as a secondary copy, such as a backup copy. Secondary storage devices may be magnetic tapes, optical disks, USB and other similar media, disk and tape drives, and so on. Of course, the system may employ other configurations of stream components not shown in the Figure.

Figure 2:
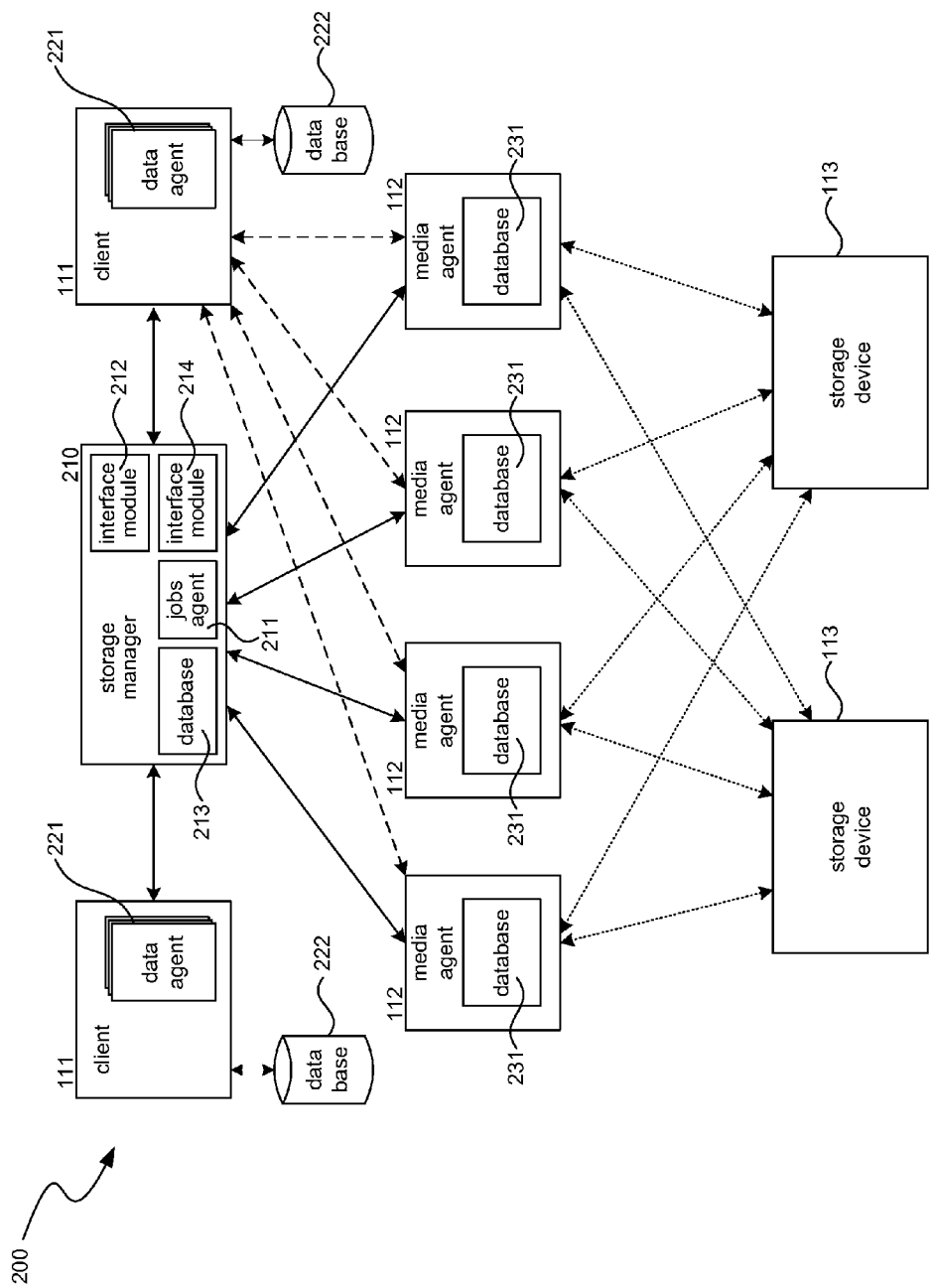
FIG. 2 is a block diagram illustrating an example of a data storage system.

Referring to FIG. 2, a block diagram illustrating an example of a data storage system, or data storage enterprise, 200 is shown. Data storage systems may contain some or all of the following components, depending on the needs of the system. FIG. 2 and the following discussion provide a brief, general description of a suitable computing environment in which the system can be implemented. Although not required, aspects of the system are described in the general context of computer-executable instructions, such as routines executed by a general-purpose computer, e.g., a server computer, wireless device or personal computer. Those skilled in the relevant art will appreciate that the system can be practiced with other communications, data processing, or computer system configurations, including: Internet appliances, network PCs, mini-computers, mainframe computers, and the like. Indeed, the terms "computer," "host," and "host computer" are generally used interchangeably herein, and refer to any of the above devices and systems, as well as any data processor.

Aspects of the system can be embodied in a special purpose computer or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), Storage Area Network (SAN), Fibre Channel, or the Internet. In a distributed computing environment, program modules may be located in both local and remote memory storage devices.

Aspects of the system may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer, and thus, while certain hardware platforms are described herein, aspects of the system are equally applicable to nodes on a network.

For example, the data storage system 200 contains a storage manager 210, one or more clients 111, one or more media agents 112, and one or more storage devices 113. Storage manager 210 controls media agents 112, which may be responsible for transferring data to storage devices 113. Storage manager 210 includes a jobs agent 211, a management agent 212, a database 213, and/or an interface module 214. Storage manager 210 communicates with client(s) 111. One or more clients 111 may access data to be stored by the system from database 222 via a data agent 221. The system uses media agents 112, which contain databases 231, to transfer and store data into storage devices 113. Client databases 222 may contain data files and other information, while media agent databases may contain indices and other data structures that assist and implement the storage of data into secondary storage devices, for example.

The data storage system may include software and/or hardware components and modules used in data storage operations. The components may be storage resources that function to copy data during storage operations. The components may perform other storage operations (or storage management operations) other that operations used in data stores. For example, some resources may create, store, retrieve, and/or migrate primary or secondary data copies. Additionally, some resources may create indices and other tables relied upon by the data storage system and other data recovery systems. The secondary copies may include snapshot copies and associated indices, but may also include other backup copies such as HSM (hierarchical storage management) copies, archive copies, and so on. The resources may also perform storage management functions that may communicate information to higher level components, such as global management resources.

In some examples, the system performs storage operations based on storage policies, as mentioned above. For example, a storage policy includes a set of preferences or other criteria to be considered during storage operations. The storage policy may determine or define a storage location and/or set of preferences about how the system transfers data to the location and what processes the system performs on the data before, during, or after the data transfer. In some cases, a storage policy may define a logical bucket in which to transfer, store or copy data from a source to a data store, such as storage media. Storage policies may be stored in storage manager 210, or may be stored in other resources, such as a global manager, a media agent, and so on. Further details regarding storage management and resources for storage management will now be discussed.

Figure 3:
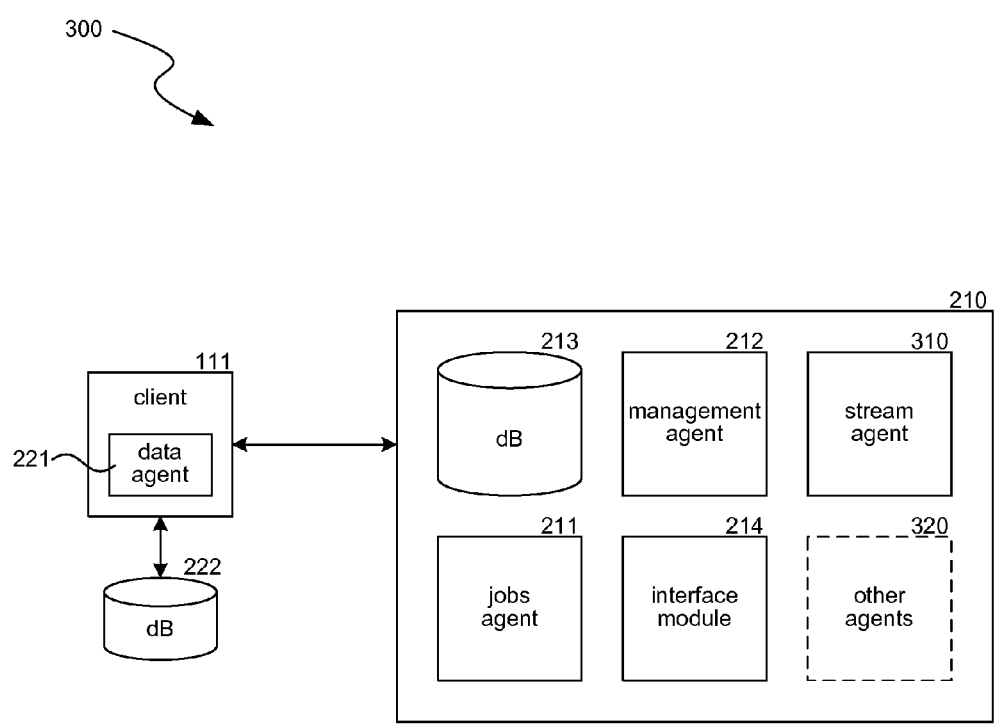
FIG. 3 is a block diagram illustrating an example of components of a server used in data storage operations.

Referring to FIG. 3, a block diagram illustrating an example of components of a server used in data storage operations is shown. A server, such as storage manager 210, may communicate with clients 111 to determine data to be copied to storage media. As described above, the storage manager 210 may contain a jobs agent 211, a management agent 212, a database 213, and/or an interface module. Jobs agent 211 may manage and control the scheduling of jobs (such as copying data files) from clients 111 to media agents 112. Management agent 212 may control the overall functionality and processes of the data storage system, or may communicate with global managers. Database 213 or another data structure may store storage policies, schedule policies, retention policies, or other information, such as historical storage statistics, storage trend statistics, and so on. Interface module 215 may interact with a user interface, enabling the system to present information to administrators and receive feedback or other input from the administrators or with other components of the system (such as via APIs).

Snapshots as Data Sources, Such as Backup Copies of a Data Set

The system may store one or more snapshots with an associated index in order to create a snapshot-based data source, such as a secondary copy of a primary volume of data. Data may be stored in various types of volumes, including primary copies or production copies, as well as various secondary copies, such as snapshots, backup copies, archival copies, and so on.

The system creates snapshots of blocks or chunks of data in a data store and an associated index that keeps track of the files imaged by the snapshot (e.g., which blocks are associated with which files and what applications are associated with the files). Thus, a snapshot becomes a way of storing data that includes application specific data. The snapshots and associated index can then be used as auxiliary copies, synthetic full copies, partial or full restores, and other secondary copies. Using snapshots as a data source allow a data storage system to be very flexible. Also, the system can manage the snapshots, such as by backing them up and deleting any original versions from the system.

The system creates snapshots using a variety of mechanisms. In some examples, the system employs hardware-based snapshot mechanisms when creating snapshots. Examples of suitable hardware-based snapshot mechanisms include EMC's Symmetrix and Clarion, Hitachi Data Storage (HDS), Network Appliance's Snapshot, and so on.

In some examples, the system employs software-based snapshot mechanisms. For example, the system may leverage continuous data replication (CDR) or discrete data replication (DDR) when creating snapshots of a volume of data. CDR generates recovery points for a volume, which can be used as a point in time snapshot of a volume. Thus, leveraging the recovery points as snapshots enables the system to generate point-in-time copies (snapshots) of a volume of data while maintaining a live copy of the volume. Of course, other mechanisms are possible.

Further, if the data storage system employs hardware having particular capabilities, such as the ability to take mirror copies or multiple snapshots, that functionality may be utilized by the snapshot and associated index. Further, snapshots may be manipulated with application programming interfaces (APIs) provided by hardware and software providers.

Figure 4:
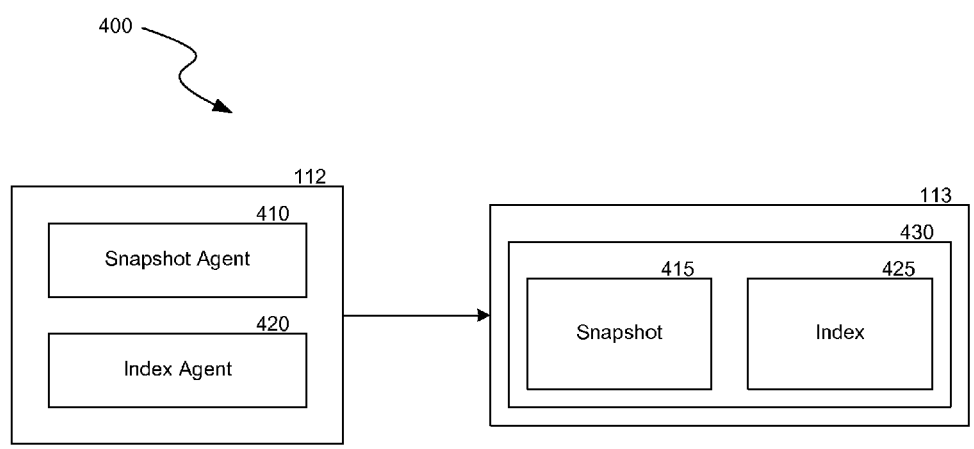
FIG. 4 is a block diagram illustrating a system for creating a snapshot based secondary copy of data.

Referring to FIG. 4, a block diagram illustrating a system for creating a snapshot-based secondary copy of data is shown. A media agent 112 includes a snapshot agent 410 and an index agent 420. The snapshot agent 410 creates a snapshot 415 of a primary data store or volume, and the index agent 420 creates an index 425 associated with the snapshot 415. The media agent 112 stores the snapshot 415 and index 425 as a secondary copy 430, which may be a backup copy, archive copy, and so on. The secondary copy 430, or snapshot based secondary copy, is stored on storage media 113, such as magnetic tape, optical disk, magnetic disk, and so on. In some cases, the snapshot and index are logically linked within the secondary copy or across resources in a data storage enterprise. The storage media 113 may be located remotely from the media agent, or may be relocated to a geographically remote location after creation and storage of the secondary copy 430 is complete.

The system may employ a number of different mechanisms when moving snapshots to secondary storage, such as magnetic tape. In some examples, the system performs block-level or chunk-based migration or transfer of snapshots from primary storage to secondary storage.

Briefly, block-level migration, or block-based data migration, involves transferring or migrating disk blocks from a primary data store (e.g., a disk partition or volume) to secondary media. Using block-level migration, a data storage system transfers blocks on a disk that have not been recently accessed to secondary storage, freeing up space on the disk. Chunked file migration, or chunk-based data migration, involves splitting a data object into two or more portions of the data object, creating an index that tracks the portions, and storing the data object to secondary storage via the two or more portions. Among other things, the chunk-based migration provides for fast and efficient storage of a data object. Additionally, chunk-based migration facilitates fast and efficient recall of a data object, such as a snapshot of a large database or virtual machine file. For example, if a user modifies a migrated file, chunk-based migration enables a data restore component to only retrieve from, and migrate back to, secondary storage the chunk containing the modified portion of the file, and not the entire file. Further details regarding block-level and/or chunk-based data migration may be found in U.S. Provisional Patent Application No. 61/096,587 filed on Sep. 12, 2008, entitled TRANSFERRING OR MIGRATING PORTIONS OF DATA OBJECTS, SUCH AS BLOCK-LEVEL DATA MIGRATION OR CHUNK-BASED DATA MIGRATION, which is hereby incorporated by reference in its entirety.

The snapshot agent 410 creates, takes, produces, and/or generates a snapshot or multiple snapshots of a data source, such as a primary volume of data or a secondary copy of a primary volume. As discussed herein, the snapshot is a representation of a set of data objects at a given point in time. The snapshot may be a complete image of a data set, or may be an incremental image of a data set. Further details with respect to the snapshot process and the types of snapshots may be found in U.S. patent application Ser. No. 10/990,353, filed on Nov. 15, 2004, entitled SYSTEM AND METHOD FOR PERFORMING AN IMAGE LEVEL SNAPSHOT AND FOR RESTORING PARTIAL VOLUME DATA.

Information regarding a snapshot is stored in a data structure. For example, a data structure may be generally organized like the following data structure:

```
{
    Snapshot Identifiers
    Snapshot Engine Identifiers
    Source Identifiers
    Destination Identifiers
    Creation Time
    Snapshot Group Identifiers
    Snapshot Type
    Storage Operation Identifiers
    Flags
    Snapshot Pruning Information
}
```

In the above data structure, the Snapshot Identifiers may include information used to uniquely identify the snapshot. The Snapshot Engine Identifiers may include information used to identify the engine that performed the snapshot. Source Identifiers and Destination Identifiers may include information about the source of the data of which a snapshot was made and where the snapshot is stored, respectively. Creation Time may be a timestamp indicating when the snapshot was made. The Snapshot Group Identifiers may identify a group to which the snapshot belongs. The Snapshot Type may include information identifying a type of the snapshot. The Storage Operation Identifiers may include information identifying a storage operation and/or storage operation elements associated with the snapshot. Flags may include one or more flags or bits set to indicate various types of information regarding the snapshot, and Snapshot Pruning Information may include information about whether or not the snapshot can be pruned.

The index agent 420 creates, generates, and/or builds a data structure, such as an index, to be associated with one or more snapshots. As described more fully below, the index may be a two tier index, may be a three tier index, or may have other index configurations, depending on the needs of the system. The two tier index may include a first entry that contains information identifying a data object, such as a file or folder, and a second entry that identifies where the file or folder is located. As an alternative, the second entry may indicate where an archive file (the file stripped of its native format) is located.

The three tier index includes the first and second entries as well as a third entry that contains the application specific data discussed herein. For example, the third entry, or tier, may contain information identifying an original mount point for an associated snapshot.

The three tier index may track specific files on a snapshot that are of interest. The three tier index describes what is on the disk (or tape), and not just the second tier index description of a file. The third tier may include an entry including information that identifies where to find data when needed within the snapshot based on an indication of what files were on the disk when the snapshot was taken, and where they were located.

For example, the index agent 420 creates the index 425 relative to a file system associated with the disk, so as to explain all the files on that disk and their locations. The index tracks an original mount point, so recovery systems can find network accessible data as and when the data moves among network resources. For example, an original file named "system.txt" may have an original mount point at "E:/mount/snap1/user1/system.txt," but the snapshot imaging the file may subsequently be remounted at a mount point at "F:/user1/system.txt." The index, via the third tier, may track such information, such as information associated with movement of the files.

Thus, the file system identifies or presents the files of interest to the index agent to create the new index. The index maps contextual information associated with a snapshot of a volume. The index data identifies an application with files of interest. Alternatively or additionally, the system may employ content indexing functions to discover content and provide that as a separate content index. Further details may be found in U.S. patent application Ser. No. 12/058,457, filed on Mar. 28, 2008, entitled METHOD AND SYSTEM FOR OFFLINE INDEXING OF CONTENT AND CLASSIFYING STORED DATA.

In some examples, the system creates an archive file when creating an archive copy or other secondary copies of a data set, such as a data set originating in a file system. The creation of an archive file enables the system, when storing or restoring data, to have both a logical view and a physical view of stored data. The logical view, represented by the archive file, enables the system to store data having a format that is neutral (or, independent) with respect to data type. The physical view, represented by an index of locations on stored physical media, enables the system to locate the data stored on the physical media as chunks, tape extents, or blocks of the archive file.

The three tier index may include two entries associated with a location of the file, such as information identifying a snapshot that imaged the file as well as information identifying a location on secondary storage that contains the file. An additional entry provides application specific data for the file, such as metadata. Thus, in some cases, the system creates a backup copy of a primary volume that includes a snapshot of the primary volume and a three tier index that contains information associated with an identification of the file, information identifying a location of an archive file associated with the file, and information providing application context information about the file (such as an original mount point for the snapshot).

Figure 5:
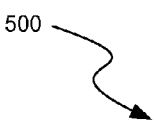
FIG. 5 is a table illustrating an index associated with a snapshot.

Referring to FIG. 5, a table illustrating a three tier index 500 associated with a snapshot is shown. The index 500 includes a file identification entry 510 that contains a name of a file, a location entry 520 that contains location information associated with a primary copy of the file, a secondary copy of the file, an archive format copy of the file, and so on, and a context or application specific entry 530 that provides information about a file system that created the file, such as an original mount point for the snapshot when the file was imaged by the snapshot. (Of course, the index 500 may include other or different information than what is shown in the Figure). For example, the location entry 520 may identify or provide identification information for the storage media, mount point, tape drive, and so on, associated with creating, updating, and/or storing a copy of the data, such as a secondary copy. In some cases, it may also provide media specific information, such as offsets on a magnetic tape. The location entry 520 may refer to a storage manager or other data storage resource when identifying a location of a copy, such as a location on a tape.

As one example, the index 500 includes information associated with a data object named "Invention.txt." This information includes a location of the archive file for the data object at "archive1" and information identifying a mount point for the snapshot that imaged the data object, at "C://snap1/user1." The index 500 may contain information about some files imaged by a snapshot (such as certain files of interest), or may contain information about all the files imaged by the snapshot. The system may build the index as follows.

Figure 6:
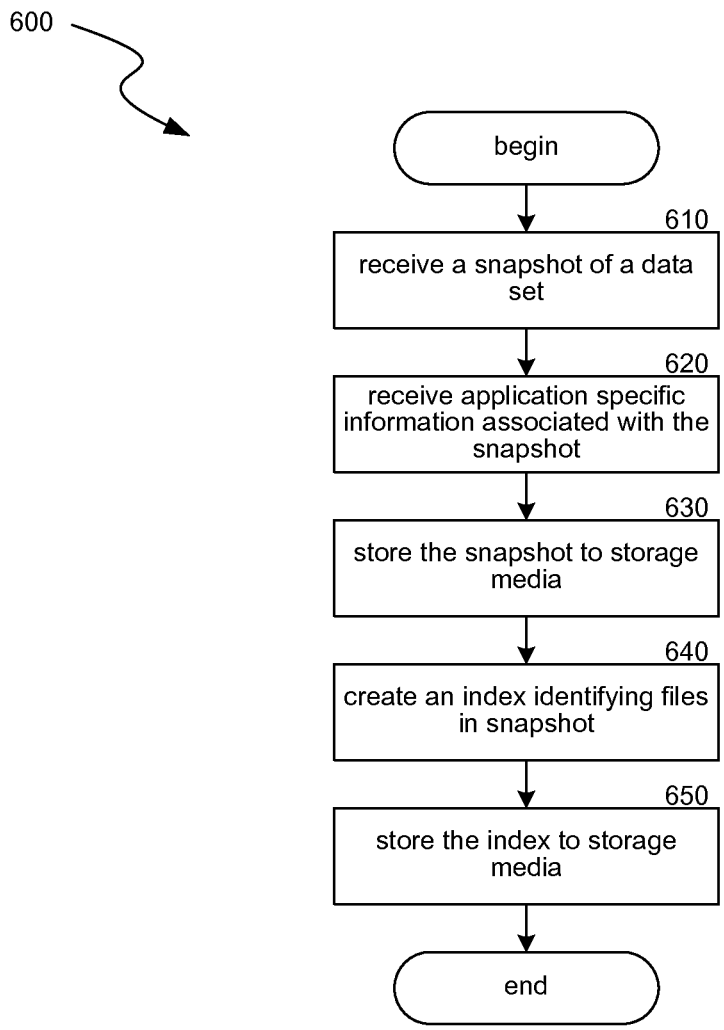
FIG. 6 is a flow diagram illustrating a routine for building an index.

Referring to FIG. 6, a flow diagram illustrating a routine 600 for building an index is shown. In step 610, an index agent receives a snapshot of a data set. For example, the snapshot agent within (or outside of) the media agent 112 creates the snapshot 415 of a primary volume of data, and sends the snapshot to the index agent.

In step 620, the index agent 420 receives or obtains context information associated with the snapshot. The index agent may query some or all of the data storage resources, such as a storage manager or jobs agent, to retrieve data associated with systems and applications that created the snapshot. For example, the index agent may query the Volume Snapshot Service (VSS) used to create the snapshot. The index agent may retrieve information for each of the individual files imaged by the snapshot, for the entire snapshot, or both. The application context information may include information about resources utilized by the snapshot agent (such as mount points), information from or about the file system and/or applications that created the snapshot, and so on.

In addition, the index agent calls the snapshot APIs to identify information associated with the snapshot. Examples of information received from the snapshot APis include unique snapshot identifiers (which may be received from the snapshot hardware or generated by the index agent), source host information identifying the computing resource that originated the underlying data from which the snapshot was created, volume information, client identifiers, path identifiers, creation time, control host identifiers, source information, server identifiers, job identifiers, and so on. For example, the system, via an agent stored on a Microsoft Exchange server, may interact with an external RAID array on the Exchange server via APIs in order to retrieve information associated with snapshots performed on the Exchange server.

In step 630, the media agent stores the snapshot to storage media. For example, the media agent 112 transfers the snapshot 415 to storage media 430 using one or more of the data paths described with respect to FIG. 1. The media agent may store the snapshot to storage media based on a storage policy, and may select storage media based on the needs of the system and on the (future) use of the stored snapshot. For example, the system may store the snapshot to magnetic tape for archival purposes.

In step 640, the system stores the received application context information in an index that identifies individual files from the data set imaged by the snapshot, and in step 650, stores the index to the storage media. That is, the system builds an index, such as the three tier index described herein, to track information within the snapshot such that an original location of the data imaged by the snapshot can be determined from the index.

As an example, the system, via an index agent, receives a snapshot taken of a primary volume, such as "snap1." The system queries a VSS, and determines the snapshot occurred at the mount point "D:/users," and was performed by a mechanism known to the system as "hardsnapB." The system then stores the snapshot and the associated information to a magnetic tape, named "tape4," at location "offset100-230" The system then updates an index, such as an index at a media agent that stored the snapshot, to include information associated the name of the tape with the name of the snapshot stored on the tape. Thus, an example index entry may be as follows:

| Snap1 | D:/users, hardsnapB | Tape4, offset100-230 |
|---|---|---|

The system may store the entry at the media agent or at other storage resources, such as a global manager. In addition, the system stores the entry along with the snapshot on the tape, to facilitate restoration of the data via the snapshot, effectively creating a copy of data (i.e., a data source), using a snapshot of the data.

In addition to creating the index, the system may add data to an existing archive table file, or other tables, to recognize that a particular data copy is a snapshot. For example, a flag may be set in the archive table file to indicate to the system that a copy is a snapshot-based copy. This may facilitate discovery of the copy, for example.

In some examples, the three-tier or multiple entry index may be stored in different locations across a data storage system. For example, information associated with the location of a snapshot on secondary storage (such as tape offset information) and the application specific information may be stored in a cache of a media agent that transfers the snapshot to the secondary storage, while the snapshot metadata may be stored by a data management component. Of course, the various indices may be stored in other locations in order to meet the needs of the system.

Data Recovery Using Snapshot Based Data Sources

Figure 7:
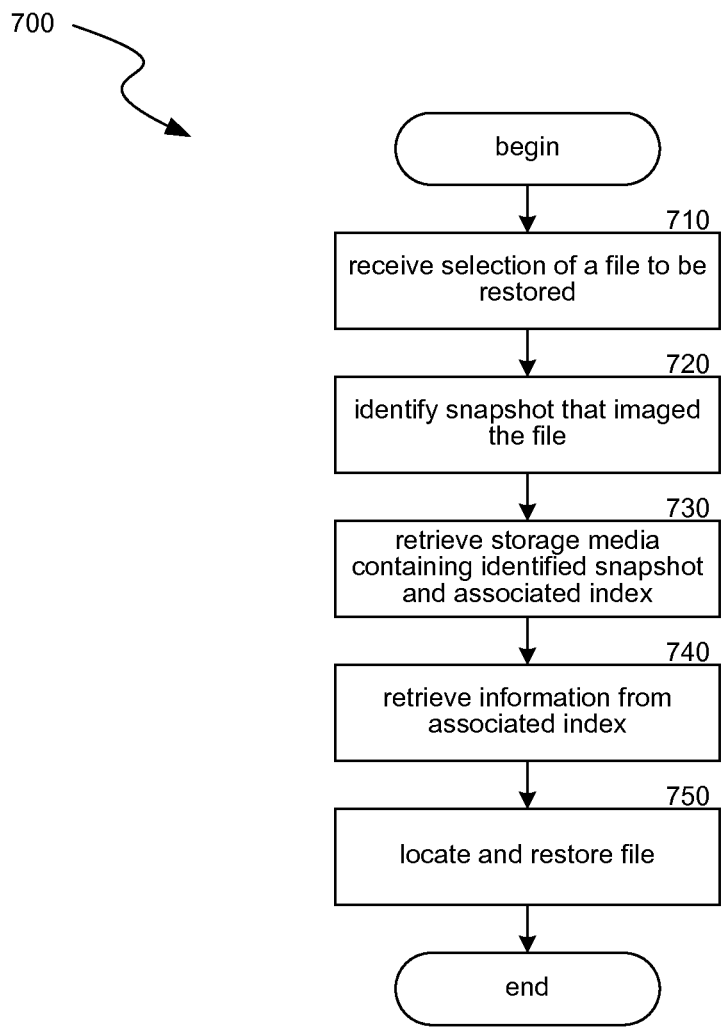
FIG. 7 is a flow diagram illustrating a routine for restoring a data object using a snapshot based secondary copy.

As described herein, the recovery of data, such as individual files, may be performed by restoring data from snapshot based secondary copies, such as backup copies. Referring to FIG. 7, a flow diagram illustrating a routine 700 for restoring a data object using a snapshot based secondary copy is shown. In step 710, a data recovery system receives an indication, selection, or request for a data object to be restored. For example, the system may present to a user a user interface showing files available for restoration, and receive the request via display elements within the user interface. For example, the system may present the files shown in table 500 of FIG. 5.

In step 720, the system identifies the snapshot that imaged the selected file. For example, the system may include a table, map or other data structure of file names and associated snapshots, and use the map to identify a snapshot that imaged the file (e.g., table 500 of FIG. 5). In step 730, the system retrieves or accesses the storage media that contains the identified snapshot and an index associated with the snapshot. For example, if the user wishes to retrieve the file "invention.txt," the system may retrieve the snapshot that images the file "invention.txt" in order to identify a location for the file.

In step 740, the system retrieves information from the associated index. For example, the system retrieves the information associated with the selected file, such as information for an archive file associated with the selected file, information associated with the file system that created the selected file, and so on.

In step 750, the system locates and restores the selected file. For example, using the retrieved information from the associated index, the system locates the archive file and application specific information for the selected file, and restores the file.

As an example, a user wishes to restore "email.txt" from a data archive. A data recovery system receives input from the user to restore the file (step 710). The system, via table 500 of FIG. 5, identifies that the snapshot mechanism snap1 at mount point "D://snap1/user2" performed a snapshot of the file (step 720). The system identifies the location of the snapshot on storage media, at "archive 3" (step 730). In this example, the information "archive 3" identifies the specific storage medium as well as the location on the medium. The system then retrieves the snapshot and uses the retrieved snapshot and known information about the snapshot to locate the file for the user.

Thus, by utilizing a snapshot based data source as the vehicle for data recovery, the system is able to take advantage of the speed of restoration associated with snapshots with the granularity associated with other backup methods, such as restoring individual files. The descriptive information in the index enables the system to quickly and efficiently identify the specific location of files imaged by the snapshot. That is, the combination of an image of a volume of a data (via a snapshot) and knowledge of the mechanisms and resources used to create the file system (via an associated index) enables the system to restore data quickly and efficiently.

Seamless Restoration of Data

As described herein, in some cases it may be advantageous to mix or use multiple, different data storage operations when creating a secondary copy of a primary volume of data. For example, a data storage system will create a full backup of a volume of data at a first point in time, and then incrementally backup the volume in subsequent points in time, only copying changes or modifications made to the volume of data after the full backup was created. Often, the full backup is more time-intensive and system-sensitive than incremental backups, because more data is being stored and system resources used during the full backup. Thus, a snapshot may be used to create the full backup, and other operations, such as continuous data replication of changes, copy-on-write snapshots, and so on, may be used for the subsequent incremental backups.

Figure 8:
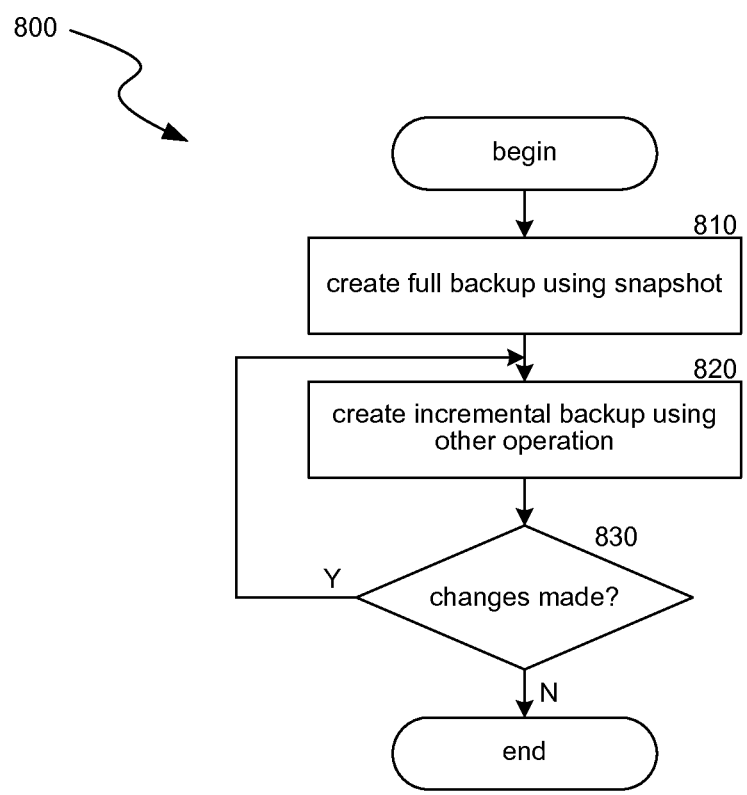
FIG. 8 is a flow diagram illustrating a routine for generating a secondary copy of a volume of data.

Referring to FIG. 8, a flow diagram illustrating a routine 800 for generating a secondary copy of a volume of data is shown. In step 810, the system creates a full backup of a primary volume using a snapshot based copy mechanism. For example, the system performs a snapshot of the primary volume at a first time, stores the snapshot to storage media, builds an index associated with the snapshot as described herein, and stores the index to the storage media with the snapshot or otherwise logically links it with that snapshot.

In step 820, the system creates an incremental copy at a second, subsequent time. The system may employ continuous data protection (CDP) or other copy mechanisms, and may transfer data directly to tape or other storage media. CDP is advantageous because it virtually ensures an error free transfer of data to the tape or to another, often remote, data store. In step 830, the system reviews the volume for any changes to the volume. The system may also review a change journal or other similar data structure. When changes are identified, routine 800 proceeds back to step 820, and performs an additional backup. Thus, a secondary copy of a volume of data is created and constantly updated using backup processes well suited for the various tasks involved.

In order to restore data from such a secondary copy, the system may treat the different data sources in a similar fashion, thereby providing seamless and efficient data recovery to a user. For example, should the user wish to restore the entire volume, the system employs the fast snapshot based recovery of the original data along with the safe, protected recovery of any subsequent changes to the data set. In addition, the system may provide for the restoration of individual files in a fast and effective manner, because the snapshot based full backup is able to restore individual files without performing a full restore. Of course, in some cases it may be advantageous to create incremental copies as a snapshot based data source. Additionally, the system may create a partial secondary copy as a snapshot based data source and the rest of the secondary copy using other data storage operations.

In some examples, the system restores data from different types of secondary copies having different formats, such as snapshots and archive copies of data. The system may create and leverage an index that normalizes, or translates the different data formats during data recovery. The index may include information that identifies the original location of data, information that identifies the current location of the data, and/or information that identifies the type of media containing the data. Thus, during a restore process, the system may review this index in order to determine a relative path to requested data. In some cases, the system may provide a user with some or all versions under management by the system. The system may facilitate searches across the index, such as those described in U.S. patent application Ser. No. 11/931, 034, filed on Oct. 31, 2007, entitled METHOD AND SYSTEM FOR SEARCHING STORED DATA, which is incorporated by reference in its entirety.

For example, a request for "file1.doc" causes the system to review an index associating "file1.doc" with an original mount point (D:/snapshot1/) for a snapshot that imaged a volume containing "file1.doc," and a current location of the snapshot (X:/tape1/snapshot1/file1.doc) now stored in a non-native format. The system can then convert the retrieved copy of the requested file to a native format, identify a path to the original mount point, and provide the requested file.

The system may be employed by current data storage systems that have snapshot capabilities. For example, the index agent and/or the snapshot agent may be introduced into a data storage system that performs snapshots, but does not utilize them as data sources, enabling the data storage system to perform the data storage operations described herein.

CONCLUSION

From the foregoing, it will be appreciated that specific examples of the data storage system have been described herein for purposes of illustration, but that various modifications may be made without deviating from the spirit and scope of the system. For example, although files have been described, other types of content such as user settings, application data, emails, and other data objects can be imaged by snapshots. Accordingly, the system is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the system provided herein can be applied to other systems, not necessarily the system described above. The elements and acts of the various embodiments described above can be combined to provide further embodiments.

These and other changes can be made to the system in light of the above Detailed Description. While the above description details certain embodiments of the system and describes the best mode contemplated, no matter how detailed the above appears in text, the system can be practiced in many ways. Details of the system may vary considerably in implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the applicant contemplates the various aspects of the system in any number of claim forms. For example, while only one aspect of the system is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the system.

We claim:

1. In a data management system residing within a private computer network that includes one or more data storage resources, a method of creating an index of data stored on a primary volume of a client computer coupled to the private computer network, the method comprising:
   performing a snapshot of data stored on the primary volume of the client computer using a hardware-based snapshot mechanism,
      wherein the performed snapshot includes a point in time representation of the data on the primary volume; and,
      wherein the snapshot creates pointers, without creating another physical copy of all the data, that map to specific disk blocks;
   receiving the performed snapshot of the data stored on the primary volume at a media agent within the data management system,
      wherein the media agent is configured to transfer the received snapshot to removable storage media;
   transferring the received snapshot to one or more removable storage media associated with the media agent,
      wherein the removable storage media includes a secondary copy of at least some of the data stored on the primary volume;
   receiving information associated with the snapshot of data stored on the primary volume,
      wherein the received information includes:
         application context information, wherein the application context information identifies an application that created the data;
         snapshot metadata, wherein the snapshot metadata identifies the hardware-based snapshot mechanism that performed the snapshot; and
         storage media information, wherein the storage media information identifies the removable storage media that includes the secondary copy of the data stored on the primary volume; and
   storing the received information in one or more indices that include entries for individual files imaged by the snapshot,
      wherein the one or more indices are located within the media agent or within a data storage management control server configured to transmit information to storage resources coupled to the private computer network; and,
      wherein the one or more indices and snapshot permit granular recovery of individual files by permitting access to portions of the individual files without having to recover an entire individual file.

2. The method of claim 1, further comprising:
   receiving a request to restore at least a portion of the data on the primary volume of the data;
   identifying, via the storage media information, the removable storage media that includes the secondary copy of the data on the primary volume;

accessing the secondary copy of the data on the primary volume to retrieve the snapshot stored on the removable storage media;

identifying, via the snapshot metadata, the snapshot mechanism that performed the retrieved snapshot;

identifying, via the application context information, the application that created the at least portion of the data; and retrieving the at least portion of the data using information from the retrieved snapshot, the snapshot mechanism, and the application that created the at least portion of the data.

3. The method of claim 1, further comprising:

receiving a request to restore at least a portion of the data on the primary volume of the data;

identifying via the storage media information, the snapshot metadata, and the application context information, a location of the at least portion of the data; and retrieving the requested at least portion of the data.

4. The method of claim 1, wherein the application context information includes information associated with an original mount point of the snapshot of the data and a subsequent mount point of the snapshot of the data, wherein the original mount point and the subsequent mount point are different from each other and track information associated with movement of the data.

5. The method of claim 1, further comprising:

directly reading a portion of data from the snapshot to restore individual files identified from the application context information.

6. The method of claim 1, further comprising:

storing the index to the removable storage media, wherein the removable storage media includes at least one magnetic tape that is indexed by a data storage manager that controls the one or more data storage resources within the private computer network.

7. A system, at least partly implemented in hardware, for creating a secondary copy of a primary volume of data, wherein the system is part of a data storage enterprise, the system comprising:

a snapshot component, wherein the snapshot component is configured to create a snapshot of a primary volume of data at a specific point in time;

wherein the snapshot component creates pointers, without creating another physical copy of all the data, that map to specific disk blocks;

an index component, wherein the index component is configured to build an index associated with the snapshot component, wherein the index includes context information related to a logical location of one or more data objects imaged by the snapshot, wherein the context information includes information identifying the logical location of the primary volume of data within the data storage enterprise, wherein the index component accesses or creates snapshot metadata and storage media information, wherein the snapshot metadata includes information associated with the created snapshot, and wherein the storage media information identifies a storage media that includes the secondary copy of the data stored on the primary volume; and, a data transfer component, wherein the data transfer component is configured to transfer the snapshot created by the snapshot component and the index built by the index component to the storage media;

wherein the transfer of the snapshot and the index creates a secondary copy of the primary volume of data, wherein the secondary copy is capable of receiving queries for restoring individual files imaged by the snapshot; and, wherein the index permits recovery of portions of the individual files by permitting access to portions of individual files within the secondary copy.

8. The system of claim 7, wherein the index includes:

a first entry that contains information identifying archive files associated with the primary volume of data;

a second entry that contains information identifying data objects within the primary volume of data; and a third entry that contains context information associated with a state of the primary volume of data at the specific point in time.

9. The system of claim 7, wherein the index includes:

information associating data objects imaged by the snapshot with information identifying a characteristic of an application that created the data objects.

10. The system of claim 7, wherein the index includes:

information associating the snapshot with resources used to create the snapshot, wherein the information includes information identifying one or more magnetic tapes that store the snapshot, information identifying offsets on the one or more magnetic tapes that store the snapshot, and information that identifies blocks in the snapshot for the secondary copy of the data object.

11. The system of claim 7, wherein the index includes:

information identifying two or more logical locations within the data storage enterprise where the snapshot imaged the primary volume of data.

12. The system of claim 7, wherein the data transfer component includes the snapshot component and the index component.

13. A non-volatile computer-readable medium containing executable code that causes a data storage system to perform a method of creating a backup copy of a data set, the method comprising:

generating a point in time copy of a data set;

storing the point in time copy of the data set to storage media;

wherein the point in time copy is created using pointers, without creating another physical copy of all the data, that map to specific disk blocks;

building a data structure associated with the point in time copy of the data set, wherein the data structure includes:

information identifying data objects within the point in time copy of the data set;

information identifying secondary copies associated with the data objects; and storing the data structure to the storage media, wherein the data structure permits granular recovery of data objects by permitting access to portions of individual data objects within secondary copies.

14. The computer-readable medium of claim 13, wherein information identifying system resources includes information indicating a location of system resources of the data storage system when the instant image of the data set was generated.

15. The computer-readable medium of claim 13, wherein generating the instant image of the data set includes:

performing continuous data replication on the data set;

identifying one or more recovery points during the performed continuous data replication; and, associating the one or more recovery points as the instant image of the data set.

16. The computer-readable medium of claim 13, wherein storing the instant image of the data set includes:
- identifying a proper subset of data blocks associated with the instant image of the data set that satisfy a criteria; and,
- storing a portion of the instant image of the data set associated with the proper subset of blocks to the storage media.

17. The computer-readable medium of claim 13,
wherein the data structure further includes:
- information identifying system resources used to create the data objects;
- information identifying an application that created the data;
- information identifying a hardware-based snapshot mechanism that performed the snapshot; and,
- information identifying a removable storage media that includes the secondary copy of the data stored on the primary volume.

* * * * *